United States Patent
Maeba

(10) Patent No.: US 11,742,718 B2
(45) Date of Patent: Aug. 29, 2023

(54) COMPONENT FOR GROUNDING

(71) Applicant: TYCO ELECTRONICS JAPAN G.K., Kawasaki (JP)

(72) Inventor: Kosuke Maeba, Kanagawa (JP)

(73) Assignee: TYCO ELECTRONICS JAPAN G.K., Kawasaki (JP)

( * ) Notice: Subject to any disclaimer, the term of this patent is extended or adjusted under 35 U.S.C. 154(b) by 92 days.

(21) Appl. No.: 17/474,649

(22) Filed: Sep. 14, 2021

(65) Prior Publication Data

US 2022/0085687 A1   Mar. 17, 2022

(30) Foreign Application Priority Data

Sep. 17, 2020  (JP) ................... 2020-156684

(51) Int. Cl.
*H02K 11/40* (2016.01)
*H02K 5/22* (2006.01)

(52) U.S. Cl.
CPC .................... *H02K 5/225* (2013.01)

(58) Field of Classification Search
CPC .... H02K 5/00–5/12; H02K 5/15; H02K 5/22; H02K 5/225; H02K 11/40
See application file for complete search history.

(56) References Cited

U.S. PATENT DOCUMENTS 9,692,278 B2 * 6/2017 Buerger ............... H02K 11/026

FOREIGN PATENT DOCUMENTS

| JP | 09-102336 A | 4/1997 |
| JP | 6591125 B1 * | 10/2019 |
| KR | 101915677 A | 11/2018 |

OTHER PUBLICATIONS

Notice of Preliminary Rejection for corresponding KR Application No. 10-2021-0123768 dated Apr. 10, 2023; English translation included (9 pages).

* cited by examiner

*Primary Examiner* — Ramon M Barrera

(57) ABSTRACT

A component for grounding having conductivity includes a first face positioned opposite a first motor case having conductivity, a second face positioned opposite a second motor case having an insulating property and positioned opposite the first motor case, and a third face positioned opposite a plug having conductivity. The first and third faces and the second face are in a front-back relation in the component for grounding, and the first face and the third face are contiguous to each other for an electrical connection between the first motor case and the plug. The second motor case is provided with a connector couplable with the plug, and, on the second motor case, at least a part of the third face has a contact-avoiding shape.

6 Claims, 11 Drawing Sheets

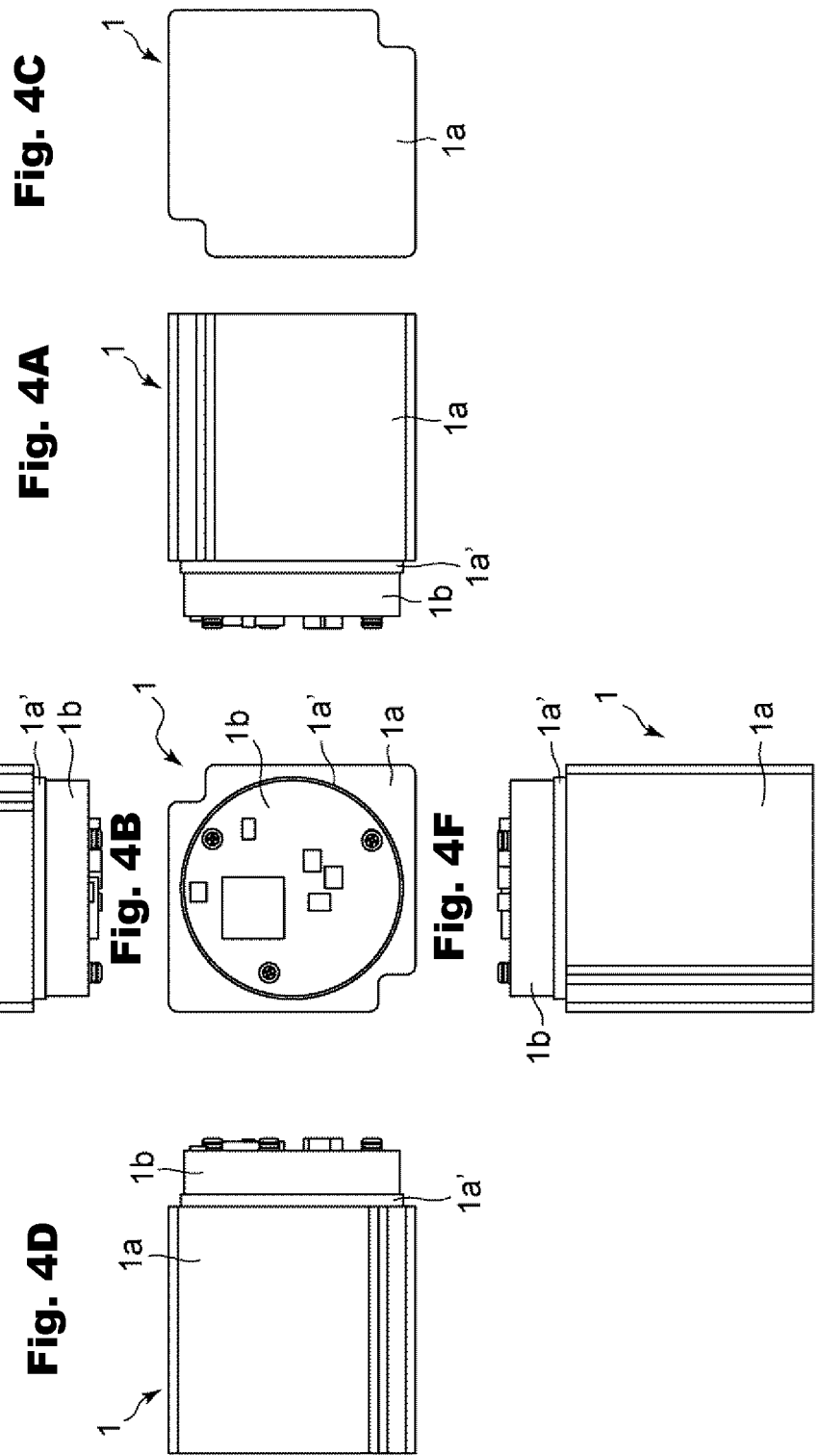

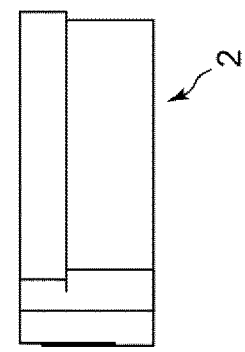
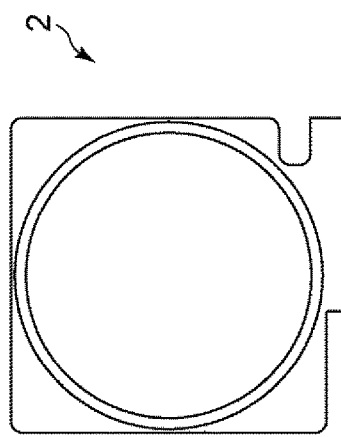
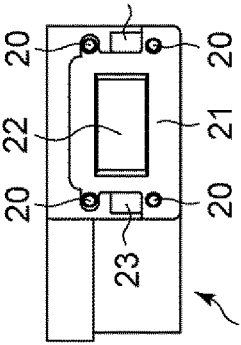
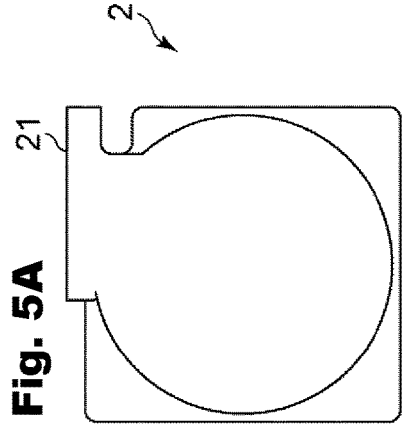
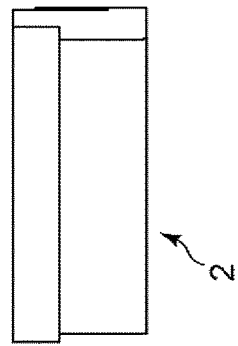
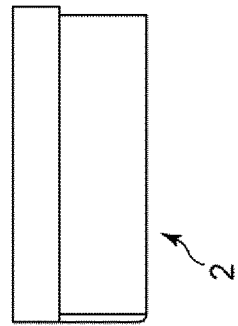

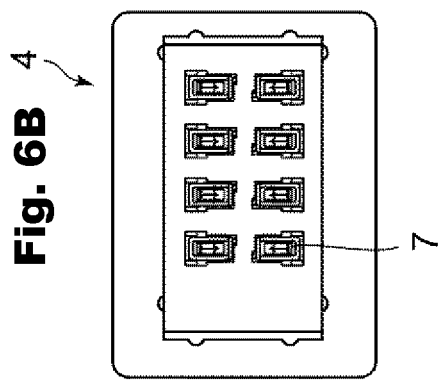
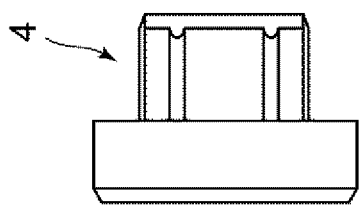
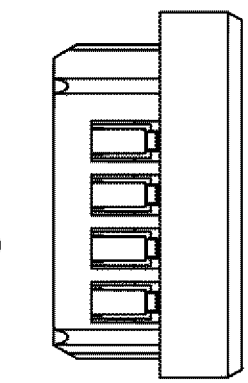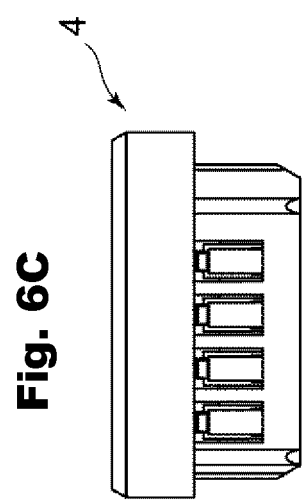
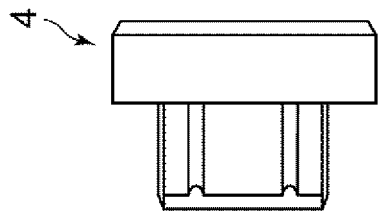

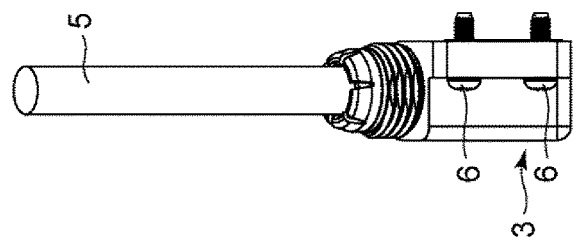
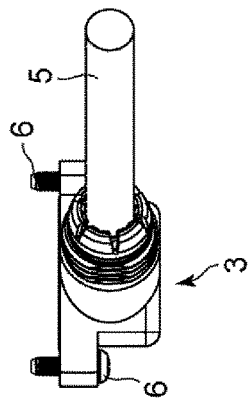
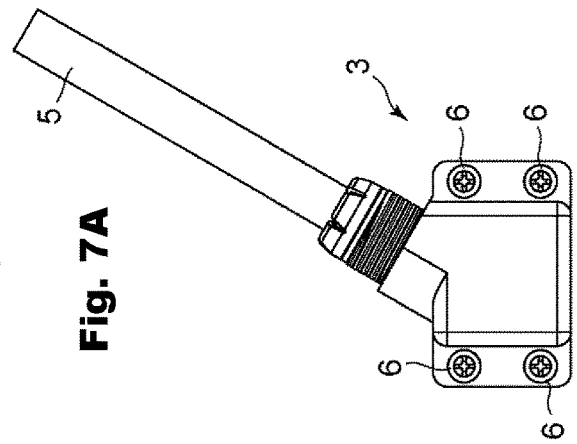
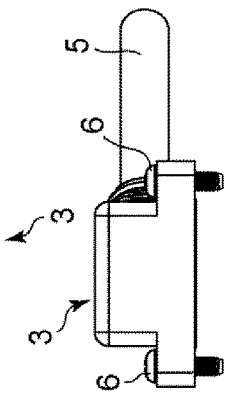
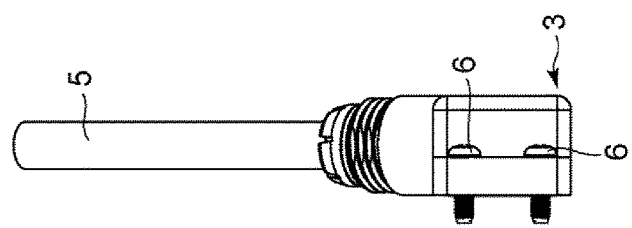
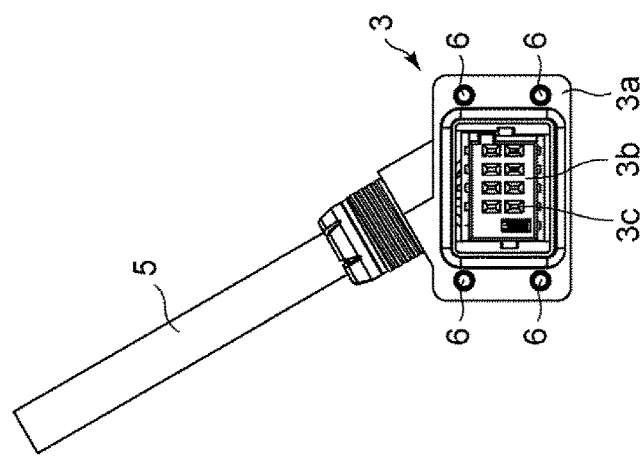

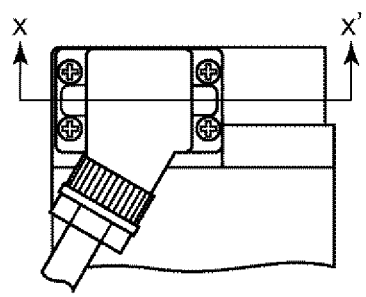
Fig. 10A
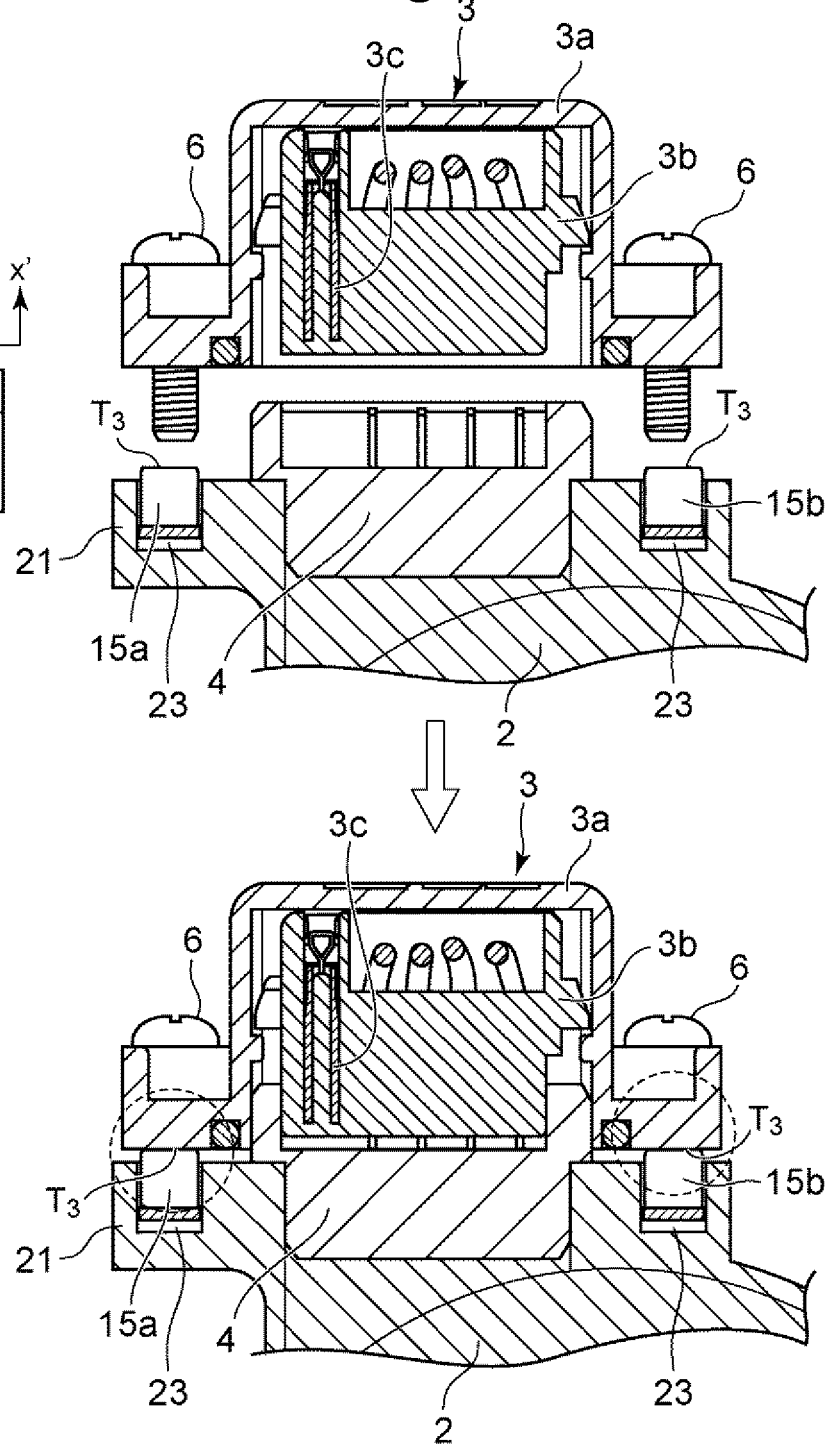
Fig. 10B
Fig. 10C

COMPONENT FOR GROUNDING

CROSS REFERENCE TO RELATED APPLICATIONS

This application claims priority to JP Application No. 2020-156684, filed 2020 Sep. 17, the subject matter of which is herein incorporated by reference in its entirety.

BACKGROUND OF THE INVENTION

The present disclosure relates to a component for grounding having conductivity. More specifically, the present disclosure relates to a component for grounding positioned between a motor and a plug and being capable of forming a ground circuit.

For example, a conventional motor described in Japanese Patent No. 6591125, or the like is provided with a case (first housing) composed of a "conductor" for covering a main body of the motor, and a case (second housing) composed of an "insulator" for covering an encoder or the like for detecting the rotation or the like of the motor. The second housing is provided with a connector connected to the encoder. The connector is couplable with a plug for connection with the outside of the motor. The motor is configured to be electrically connectable with the outside of the motor through a conducting cable connected to such a plug.

In the conventional motor described in Japanese Patent No. 6591125, a plate-like metal fitting is positioned as a "component for grounding" between the second housing composed of an "insulator" and the connector composed of a "conductor" and positioned on the second housing. More specifically, the plate-like metal fitting is interposed between the second housing composed of an "insulator" and the connector composed of a "conductor", and fastened together with screws (for example, see FIG. 3 of Japanese Patent No. 6591125). On the other hand, such a plate-like metal fitting is so bent as to be also positioned between the second housing composed of an "insulator" and the first housing composed of a "conductor", and is also configured to be able to conduct electricity in contact with the first housing (for example, see FIG. 4 of Japanese Patent No. 6591125). The conventional motor uses such a plate-like metal fitting to form an electrical connection such as a ground circuit (GND circuit) between the first housing composed of a "conductor" and the connector also composed of a "conductor".

In the conventional motor, the component for grounding forming an electrical connection such as a ground circuit is not without disadvantages. The conventional grounding metal fitting may be unable to maintain the ground circuit, for example in a severe temperature environment due to long-term use of the motor, or the like. For example, one or both of expansion and contraction after such expansion of each component of the motor, more specifically, expansion of a component such as the second housing composed of an "insulator" or the connector, may cause loosening of the screws or the like fastening the grounding metal fitting together, resulting in a failure to maintain the ground circuit. As an example, the ground circuit may be unable to be maintained in a severe temperature environment at 100° C. or above for a certain period of time or more, more specifically, a severe temperature environment at 105° C. for ten days. Alternatively, as an example, the ground circuit may be unable to be maintained in a temperature cycling test in the range of minus 55° C. to 85° C. (for twenty-five hours). For example, the ground circuit may be unable to be maintained because of the expansion in a high temperature tester or the contraction in the process of returning to an ambient temperature after removal from the high temperature tester. Furthermore, in the conventional metal fitting, a problem lies in interposing the plate-like metal fitting between the connector composed of a "conductor" and the second housing composed of an "insulator" and fastening them together with the screws. Such a configuration may cause breakage of the connector, the second housing, or the grounding metal fitting interposed therebetween when the plug is detached for maintenance and inspection or the like, resulting in a failure to maintain the ground circuit.

There is a need for a component for grounding capable of forming a ground circuit having more improved durability.

BRIEF DESCRIPTION OF THE INVENTION

In an embodiment, a component for grounding having conductivity is provided including a first face positioned opposite a first motor case having conductivity, a second face positioned opposite a second motor case having an insulating property and positioned opposite the first motor case, and a third face positioned opposite a plug having conductivity. The first and third faces and the second face are in a front-back relation in the component for grounding, and the first face and the third face are contiguous to each other for an electrical connection between the first motor case and the plug. The second motor case is provided with a connector couplable with the plug, and, on the second motor case, at least a part of the third face has a contact-avoiding shape.

Optionally, the contact-avoiding shape may be a substantially U-shape in a top view. The first face of the component for grounding may have a spring-like portion abutting with the first motor case, and the spring-like portion has both a fixed end and a free end. The third face of the component for grounding may have a spring-like portion abutting with the plug, and the spring-like portion has both a fixed end and a free end. The free end may abut with the plug. The component for grounding may be a single component.

BRIEF DESCRIPTION OF THE DRAWINGS

FIGS. 4A to 4F are schematic diagrams schematically showing an example of a first motor case;

FIGS. 5A to 5F are schematic diagrams schematically showing an example of a second motor case;

FIGS. 6A to 6F area schematic diagrams schematically showing an example of a connector;

FIGS. 7A to 7F are schematic diagrams schematically showing an example of a plug;

FIGS. 10A to 10C are schematic diagrams schematically showing a relation between the component for grounding according to an embodiment of the present disclosure and the plug.

DETAILED DESCRIPTION OF THE INVENTION

Figure 1A:
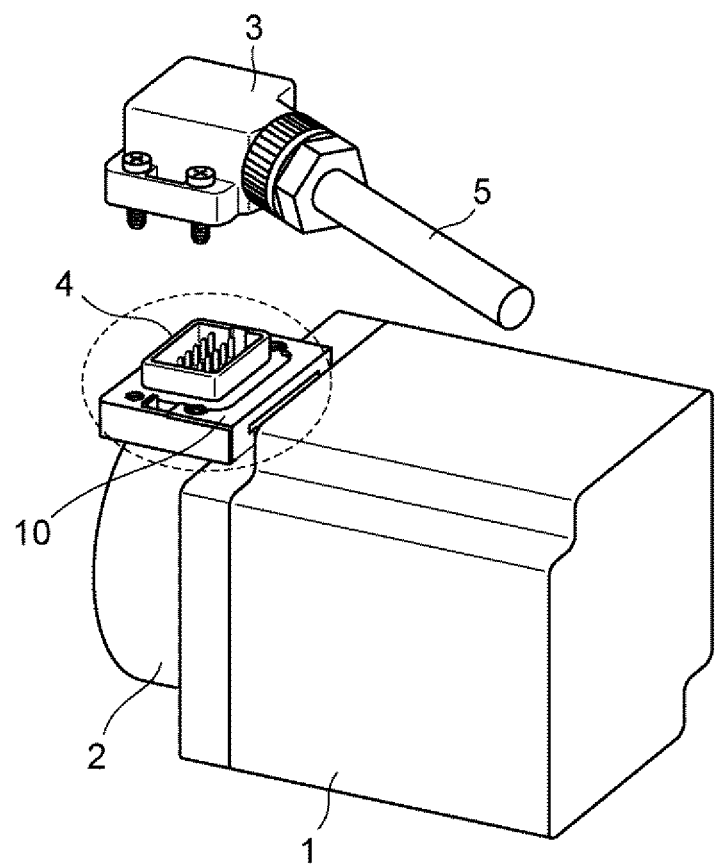
FIGS. 1A and 1B are schematic diagrams schematically showing a relation between main components relating to a motor and a component for grounding of the present disclosure.
Figure 1B:
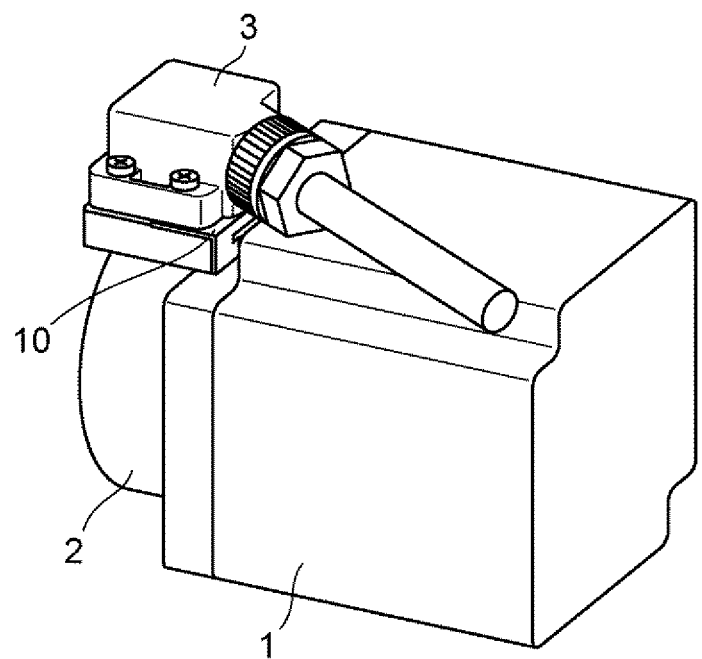
Figure 2:
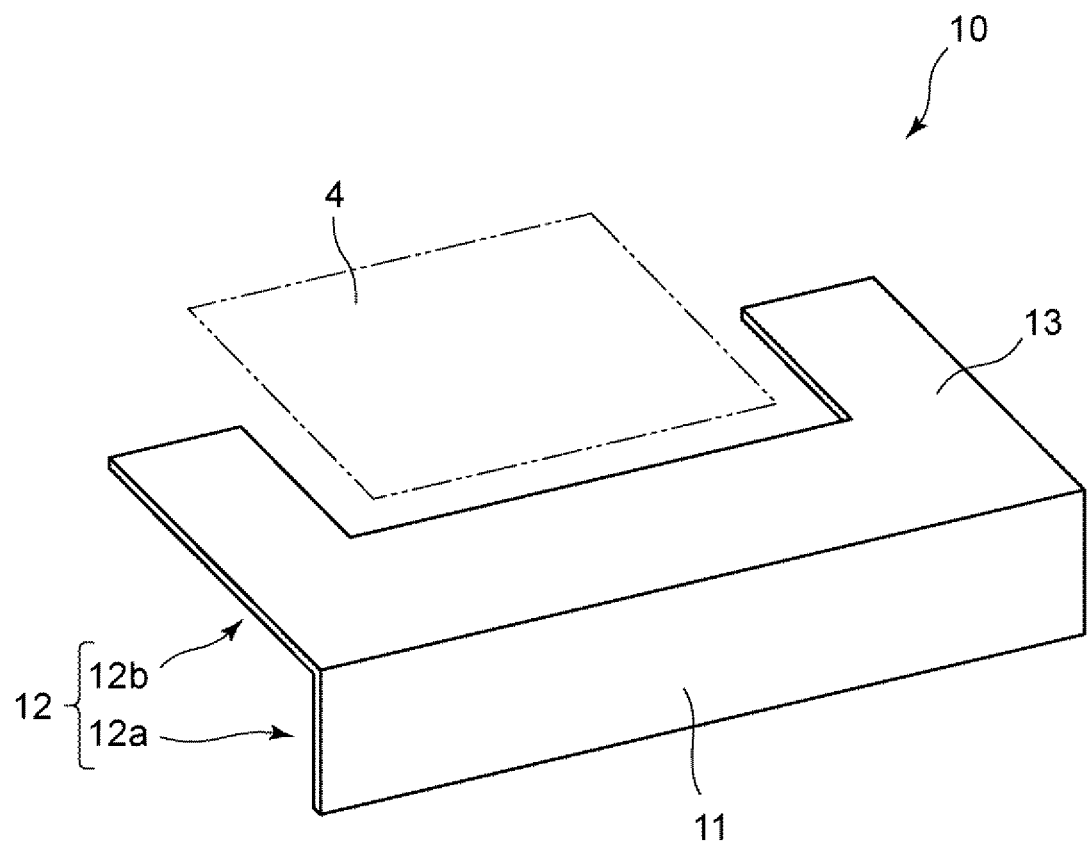
FIG. 2 is a schematic diagram schematically showing the component for grounding of the present disclosure.

In an embodiment, a component for grounding is provided wherein a part of the shape of the component for grounding is formed into such a shape as not to contact a connector (hereinafter, referred to as "contact-avoiding shape"), such as shown in FIGS. 1A and 1B and FIG. 2, for example, thereby avoiding direct or physical contact between the component for grounding and the connector, thereby improving the durability of the component for grounding.

In various embodiments, the component for grounding may be brought into direct or physical contact with not the connector but a conductive plug, thereby forming an electrical connection such as a ground circuit between the plug and a conductive motor case. Such a configuration can maintain the ground circuit even in a severe temperature environment.

In an embodiment, a component for grounding having conductivity is provided including, at least, a first face positioned opposite a first motor case having conductivity; a second face positioned opposite a second motor case having an insulating property and positioned opposite the first motor case; and a third face positioned opposite a plug having conductivity, wherein the first and third faces and the second face are in a front-back relation in the component for grounding, and the first face and the third face are contiguous to each other for an electrical connection between the first motor case and the plug, and the second motor case is provided with a connector couplable with the plug, and, on the second motor case, at least a part of the third face has a contact-avoiding shape.

In an embodiment, a component for grounding is provided capable of forming an electrical connection such as a ground circuit having improved durability. A ground circuit having improved durability can be formed particularly between a plug and a conductive motor case.

The present disclosure relates to a component for grounding having conductivity. For example, as shown in FIGS. 1(A) and 1(B) and FIG. 2, a component for grounding (10) is composed of a plate-like or sheet-like element. The component for grounding (10) has, at least, a "first face" (a face indicated by a reference sign 11 in FIG. 2), a "second face" (a face indicated by a reference sign 12 in FIG. 2), and a "third face" (a face indicated by a reference sign 13 in FIG. 2), such as shown in FIG. 2, for example. The first face (11) is a face that may be positioned opposite a first motor case 1 having conductivity. The second face (12) is a face that may be positioned opposite a second motor case 2 having insulating property and provided opposite the first motor case 1. The third face (13) is a face that may be positioned opposite a plug 3 having conductivity (see FIG. 1A). The first and third faces and the second face have a front-back relation in the component for grounding of the present disclosure (see FIG. 2). The first face (11) and the third face (13) are contiguous to each other for an electrical connection between the first motor case 1 and the plug 3 (see FIG. 2).

The second motor case 2 is provided with a connector 4 couplable with the plug 3, and, on the second motor case 2, the component for grounding of the present disclosure has, for example, a shape that does not contact the connector 4 so that it may be positioned around the connector 4, for example, a "contact-avoiding shape" such as a substantially U-shape in a top view (see FIGS. 1A and 2). It should be noted that the shape of the component for grounding is not particularly limited, but, other than a substantially-U-shape, it may be, for example, a substantially rectangular shape (a frame-like shape), a substantially C-shape, a substantially circular shape, a polygonal shape, or the like.

Since having such a configuration as described above, the component for grounding 10 can provide an electrical connection between the first motor case 1 having "conductivity" described in detail below (see FIGS. 4(A) to 4(F)) and the plug 3 having "conductivity" also fully described below (see FIGS. 7(A) to 7(F)). More specifically, an electrical connection such as a ground circuit can be formed between the first motor case 1 and the plug 3 via the "component for grounding" positioned on the second motor case 2 having an "insulating property" fully described below. An electrical connection that may be formed by the component for grounding 10 has more improved durability. In a particularly severe temperature environment, an electrical connection having more improved durability can be provided.

It should be noted that the component for grounding 10 should not be construed as being limited to a form shown.

Hereinafter, terms used in the present disclosure and main components of a motor will be briefly described, and then the component for ground of the present disclosure will be fully described.

The "conductivity" may also be referred to as electrical conductivity, and generally means the property of allowing passage of electricity. When the term "conductivity" is used in conjunction with the term "insulating property", the property of transmitting electricity relatively easily may be referred to as "conductivity".

The "insulating property" may also be referred to as electrical insulating property, and generally means the property of not allowing passage of electricity. When the term "insulating property" is used in conjunction with the above "conductivity", the property of transmitting electricity relatively with difficulty may be referred to as "insulating property".

The "electrical connection" generally means being electrically continuous or being electrically conducting.

The "ground" (GND) means a potential point where voltage becomes reference (for example, 0 V). Accordingly, the ground circuit means a circuit or a route in which a potential point where voltage becomes reference (for example, 0 V) can be provided.

"Severe temperature environment" means, for example, an environment or the like where the temperature of the motor or around the motor is elevated because of long-term continuous or intermittent operation of the motor fully described below, temperature addition, for example in the manufacturing process or the like, or the like. The severe temperature environments include, for example, temperatures equal to or higher than a room temperature, and means, as an example, an environment at 50° C. or higher and 200° C. or lower in the manufacturing process or the like. More specifically, it means an environment where the motor undergoes temperatures ranging from about 140 to 200° C. in the manufacturing process or the like. It also means a temperature environment at 100° C. or higher for a certain period of time or longer as an example, more specifically, an environment at 105° C. for ten days. Alternatively, the severe temperature environments may also include, as an example, an environment or the like during a temperature cycling test in a range from minus 55° C. to 85° C. (for twenty-five hours). In the present disclosure, an electrical connection, particularly a ground circuit, can be maintained in such a "severe temperature environment".

The "motor", which is also called electric motor, means a prime mover that can convert electrical energy into kinetic or mechanical energy. The motor includes a DC motor and an AC motor, or the like. A motor commercially available can be used as the motor without any particular limitation.

The motor is generally provided with a motor main body, a first case (hereinafter, referred to as "first motor case") covering the motor main body, and a second case (hereinafter, referred to as "second motor case") that may be positioned opposite the first motor case.

The "motor main body" is basically provided with a rotor and a stator. The motor main body may have a rotary shaft or the like attached thereto for transmitting rotation to the outside. The rotary shaft may have a bearing attached thereto. Such a bearing may be attached to the first motor case.

The "first motor case", as fully described later, is a component that can be positioned opposite the "second motor case". The first motor case generally has "conductivity". The first motor case may include, for example, a metal and/or an alloy, or the like. It is preferred in terms of strength and/or heat radiation, or the like that the first motor case be composed of a conductor such as a die-cast including a metal and/or an alloy.

For example, FIGS. 4(A) to 4(F) show an embodiment of the first motor case that can be used in the present disclosure. The first motor case 1 shown in FIGS. 4(A) to 4(F) may have an encoder portion 1b on a seating portion 1a' of a case main body 1a (FIG. 4A).

Here, FIG. 4(A) shows one side face of the first motor case 1. FIG. 4(B) shows the first motor case 1 as viewed from the encoder portion 1b side. FIG. 4(C) shows the first motor case 1 as viewed from a side opposite to the encoder portion 1b (the rotary shaft and the like are not shown). FIG. 4(D) shows the other side face of the first motor case 1. FIG. 4(E) shows the first motor case 1 as viewed from an upper side (a side on which the connector 4 is attached to the second motor case 2). FIG. 4(F) shows the first motor case 1 as viewed from a lower side (a side opposite to the upper side). The first motor case 1 is not limited to a form shown.

A detector for detecting the rotation of the motor, specifically, the rotation of the rotor and/or the rotary shaft, for example, may be provided in the encoder portion 1b. The detector includes a photodetector utilizing a light-emitting device and a light-receiving device and/or a magnetic detector utilizing magnetism, or the like. The encoder portion 1b may be further provided with a communication device for communicating with external equipment. In addition, electric power may be supplied to the motor main body via the encoder portion 1b.

The shape of the case main body 1a is not particularly limited, but is preferably cylindrical. The cross-sectional shape of the case main body 1a may be substantially rectangular or substantially circular.

The shape of the seating portion 1a' is not particularly limited, but is preferably a disk-like or annular shape.

The shape of the encoder portion 1b is not particularly limited but is preferably a disk-like shape. The encoder portion 1b may be fixed with a screw to the seating portion 1a' of the case main body 1 like a form shown (see FIG. 4B).

The "second motor case" is a component that can be positioned opposite the first motor case, specifically, the case main body 1a, the seating portion 1a' and/or the encoder portion 1b shown in FIGS. 4(A) to 4(F). The second motor case has an "insulating property" since the connector 4 couplable with the plug 3 connected to a conducting cable 5, or the like is attached thereto, for example.

The second motor case can be composed of, for example, a material such as a plastic, for example, a material such as an insulative plastic having suitable strength and durability.

For example, FIGS. 5(A) to 5(F) show an embodiment of the second motor case that can be used in the present disclosure. The second motor case 2 shown in FIGS. 5(A) to 5(F) is opposed to the first motor case 1, and, preferably, has such a shape as to cover the encoder portion 1b of the first motor case 1. More specifically, the second motor case 2 has a substantially circular portion that can cover the encoder portion 1b of the first motor case 1, and a substantially rectangular portion that can be opposed to and contact the main body portion 1a of the first motor case 1. Furthermore, the second motor case 2 may be provided with, for example, a stage 21 for mounting the connector 4 shown in FIGS. 6(A) to 6(F). The stage 21 may have an opening portion 22 for inserting thereinto a part of the connector 4, specifically, a part of a bottom thereof.

Here, FIG. 5(A) shows the second motor case 2 as viewed from an outer side (a side not facing the first motor case 1). FIG. 5(B) shows the second motor case 2 as viewed from an upper side (a side on which the connector 4 is attached). FIG. 5(C) shows the second motor case 2 as viewed from a side facing the encoder portion 1b of the first motor case 1. FIG. 5(D) shows one side face of the second motor case 2. FIG. 5(E) shows the other side face of the second motor case 2. FIG. 5(F) shows the second motor case 2 as viewed from a lower side (a side opposite to the upper side). The second motor case 2 is not limited to a form shown.

The second motor case 2 can be positioned opposite the first motor case 1, and they can be coupled with each other. A method of coupling the second motor case 2 with the first motor case 1 is not particularly limited, but, for example, coupling by means of any locking mechanism, a fixing means such as a screw, mating and/or engaging, or the like may be mentioned.

The "connector" is a component attached to the second motor case for providing an electrical connection with the motor main body that may be accommodated in the first motor case and/or with the encoder portion that may be included in the first motor case 1. A connector commercially available can be used as the connector without any particular limitation. For example, an embodiment of the connector that can be used in the present disclosure is shown in FIGS. 6(A) to 6(F).

FIG. 6(A) shows the connector 4 as viewed from an upper side (a side on which the connector 4 is coupled with the plug 3). FIG. 6(B) shows the connector 4 as viewed from a lower side (a side on which the connector 4 is coupled with the second motor case 2). FIG. 6(C) shows the connector 4 as viewed from a side not facing the first motor case 1). FIG. 6(D) shows the connector 4 as viewed from a side facing the first motor case 1. FIG. 6(E) shows one side face of the connector 4. FIG. 6(F) shows the other side face of the connector 4. The connector 4 is not limited to a form shown.

The connector 4 may have a part of its main body portion extending downward (hereinafter, referred to as "extending portion"). The extending portion of the connector 4 can be inserted into, for example, the opening portion 22 provided in the stage 21 of the second motor case 2 (see FIGS. 1A and 5(B)). Such a configuration enables the connector 4 to be placed on the state 21 of the second motor case 2. It is preferred that the connector 4 and the second motor case 2 be coupled with each other and fixed thereto. A method of fixing the connector 4 to the second motor case 2 is not particularly limited, but, for example, fixation by means of any locking mechanism, a fixing means such as a screw, mating and/or engaging, or the like may be mentioned.

The main body portion of the connector 4 may be insulative or conductive. The main body portion of the connector 4 may be composed of, for example, a metal, an alloy, a plastic, or the like.

The connector 4 is couplable with, for example, the plug 3 shown in FIGS. 7(A) to 7(F). This enables an electrical connection with the conducting cable 5 connected to the plug 3, and consequently an electrical connection with the outside. Therefore, it is preferred that the connector 4 have a shape mutually complementary to the plug 3. It should be noted that, though fully described below, the plug 3 may be composed of a plug cover 3*a*, a plug main body 3*b*, and a contact 3*c* (see FIGS. 7(A) to 7(F)).

For example, as shown in FIGS. 6(A) to 6(F), the connector 4 may include one or more contacts 7. The contact 7 can be mated and/or engaged with one or more contacts 3*c* (see FIG. 7B) provided in the plug 3, and electrically connected therewith. Therefore, it is preferred that the contact 7 provided in the connector 4 and the contact 3*c* provided in the plug 3 have mutually complementary shapes. In the form shown, the contact 7 of the connector 4 is a male type and the contact 3*c* provided in the plug 3 is a female type, but the contact 7 provided in the connector 4 may be a female type and the contact 3*c* provided in the plug 3 may be a male type.

The contact 7 that may be provided in the connector 4 may extend to the side facing the second motor case 2 of the connector 4 through the main body portion of the connector 4. The contact 7 may be electrically connected with the motor main body that may be accommodated inside the first motor case 1 and/or with the encoder portion 1*b* that may be included in the first motor case 1. Such a connection may be direct or indirect.

The "plug" is a component that may be electrically connected with the conducting cable, and that can be coupled with the above connector to supply electricity and/or electric power to the motor main body and/or the encoder portion, or the like. A plug commercially available can be used as the plug without any particular limitation.

For example, FIGS. 7(A) to 7(F) show an embodiment of the plug that can be used in the present disclosure. The plug 3 may be provided with, for example, the plug cover 3*a*, the plug main body 3*b* that may be positioned in the plug cover 3*a*, and the one or more contacts 3*c* that may be positioned in the plug main body 3*b*. The configuration of the plug 3, however, is not limited to such a configuration.

The plug 3 can be electrically connected to the conducting cable 5. Specifically, one or more electrical wires that may be included in the conducting cable 5 are electrically connected with the contacts 3*c*, thereby enabling electrical conduction to be formed. The contact 3*c* does not have any particular limitation on its shape as long as the contact 3*c* is electrically connectable with the contact 7 that may be positioned in the connector 4.

FIG. 7(A) shows the plug 3 as viewed from an upper side. FIG. 7(B) shows the plug 3 as viewed from a lower side (a side opposite to the upper side and on which the plug 3 is coupled with the connector 4). FIG. 7(C) shows the plug 3 as viewed from a side not facing the first motor case 1. FIG. 7(D) shows the plug 3 as viewed from a side facing the first motor case 1. FIG. 7(E) shows one side face of the plug 3. FIG. 7(F) shows the other side face of the plug 3. The plug 3 is not limited to a form shown.

A method of coupling the plug 3 and the connector 4 together is not particularly limited, but, for example, coupling by means of any locking mechanism, mating and/or engaging, or the like may be mentioned.

The plug 3 may be fixed to the second motor case 2 coupled with the connector 4. A method of fixing the plug 3 to the second motor case 2 is not particularly limited. For example, the plug 3 may be fixed to the second motor case 2 using a fixing means such as a screw, as in the form shown (see FIGS. 1(A) and 1(B)). Alternatively, without using a fixing means such as a screw, the plug 3 may be fixed to the second motor case 2 by means of any locking mechanism, mating and/or engaging, or the like.

If the plug 3 is fixed to the second motor case 2, the plug 3 may be conductive or insulative since the second motor case 2 has an "insulating property". The plug 3 is generally conductive. For example, it is preferred that the plug cover 3*a* have conductivity. In that case, it is preferred that the plug main body 3*b* that may accommodate the one or more contacts 3*c* be insulative.

If the plug cover 3*a* has conductivity, the plug cover 3*a* may include, for example, a metal and/or an alloy, or the like. The plug cover 3*a*, in terms of strength, can be composed of a conductor such as a die-cast including a metal and/or an alloy. Alternatively, the plug cover 3*a* may be made conductive by forming it from, for example, a material having an insulating property such as a plastic, more specifically, a material such as a plastic having suitable strength and durability, and covering or plating its surface with a conductor such as a metal and/or an alloy. In this case, the plug cover 3*a* may expand and/or contract under the influence of heat or the like, but by using the component for grounding 10, grounding between the plug cover 3*a* and the first motor case 1 can be more suitably maintained.

If the plug cover 3*a* has conductivity, it is preferred that the plug main body 3*b* be formed from a material having an insulating property, for example, a material such as a plastic having suitable strength and durability. Alternatively, if the plug cover 3*a* has an insulating property, the plug main body 3*b* may have conductivity. Therefore, the "plug having conductivity" in the present disclosure means a plug whose plug cover 3*a* or plug main body 3*b* has conductivity.

A contact commercially available can be used as the contact 3*c* without any particular limitation.

A cover for preventing entry of moisture, dust, or the like, specifically, a cover having such a bellows-like shape as shown, or the like, may be provided at a portion where the plug 3 and the conducting cable 5 are connected together. In addition, a packing for preventing entry of moisture or dust, for example, a rubber packing and/or liquid packing, or the like, may be provided, if necessary, at a portion where the plug 3 and the second motor case 2 contact each other. Such a packing may be provided on either one of the plug 3 and the second motor case 2.

The "conducting cable" is a component directly or indirectly connectable with an external electrical power supply source or the like. The conducting cable may have one or more electrical wires inside. The electrical wire includes an electrical wire for supplying electrical power to the motor main body, an electrical wire for supplying electrical power to the encoder portion, an electrical wire for supplying electrical power to the communication device, or the like. The conducting cable may also include a network communication line that may be connected to the communication device. A cable including an electrical wire commercially available can be used as the conducting cable without any particular limitation.

The "component for grounding" generally means a component having conductivity and capable of providing an "electrical connection", particularly a "ground circuit".

The component for grounding 10, for example as shown in FIGS. 1(A) and 1(B) and FIG. 2, may be composed of, for example, a plate-like element, so as to have, at least, the first face (the face indicated by the reference numeral 11 in FIG. 2) positioned opposite the first motor case 1 having conductivity, the second face (the face indicated by the reference numeral 12 in FIG. 2) positioned opposite the second motor case 2 having an insulating property and positioned facing the first motor case 1, and the third face (the face indicated by the reference numeral 13 in FIG. 2) positioned opposite the plug 3 having conductivity. The component for grounding 10 can be manufactured, for example by bending a plate-like material stamped out from a material including a metal and/or an alloy. It is preferred that the component for grounding 10 be manufactured from a material such as stainless (SUS) steel or phosphor bronze. Alternatively, the component for grounding 10 may be made conductive by molding, for example, a material having an insulating property such as a plastic, for example, a material such as a plastic having suitable strength and durability, into a desired shape, and thereafter covering or plating its surface with a conductor such as a metal and/or an alloy, as long as the component for grounding 10 has conductivity.

In the component for grounding 10, the first face (11) and the third face (13) have a front-back relation to the second faces (12).

The "front-back relation" in the present disclosure means a relation between two opposite main faces of the plate-like element, and it does not matter which face is front or which face is back. For example, as shown in FIG. 2, if the first face (11) and the third face (13) are front, the second face (12a) is located on the back side of the first face (11), and the second face (12b) is located on the back side of the third face (13).

As can be seen from a form shown, the component for grounding 10 is mainly composed of the first, second and third faces. It should be noted that the component for grounding 10 may include a face other than the first, second and third faces.

In the component for grounding 10, at least both the first face (11) and the third face (13) are conductive, and all faces of the component for grounding may be conductive.

The first face (11) is a face that is conductive and that may be positioned opposite the first motor case 1 which is also conductive. Therefore, the first face (11) and the first motor case 1 can be electrically connected in partial contact with each other.

The third face (13) is a face that is conductive and that may be positioned opposite the plug 3 which is also conductive. Therefore, the third face (13) and the plug 3 can be electrically connected in partial contact with each other.

Since the first face (11) that is conductive and the third face (13) that is also conductive are contiguous to each other (see FIG. 2), an electrical connection, more specifically, a ground circuit, can be formed between the first motor case 1 that is conductive and the plug 3 that is also conductive (see FIG. 1B).

Since the second face (12) is a face that may be positioned opposite the second motor case 2 which is insulative, the second face (12) may be conductive or insulative.

For example, as shown in FIG. 2, the component for grounding 10 can be placed on the second motor case 2 via the second face (12) (see FIG. 1A). Since the second motor case 2 is provided with the connector 4 couplable with the plug 3 (see FIGS. 5(A) to 7(F)), at least a part of the component for grounding 10 has a "contact-avoiding shape", specifically, a shape that does not contact the connector 4, or the like. It is preferred that, on the second motor case 2, the component for grounding 10 be configured, for example, so that it can be positioned around the connector 4 (see FIG. 2).

In the present disclosure, the "contact-avoiding shape" means a shape that does not bring at least a part (namely, a whole or part) of the component for grounding 10, specifically, the third face, and the connector into physical contact with each other. For example, as shown in FIG. 2, the component for grounding 10 may have such a shape that it may be positioned around a region for positioning the connector 4 drawn in broken line, without physically contacting the connector 4. In other words, the component for grounding 10, in a top view, may have such a shape that it can be separated from the connector 4 and at least partially surround the connector 4 (see FIGS. 2 and 3A).

The "contact-avoiding shape" may also include, for example, such a shape in a top view as to be able to avoid contact with the connector 4, for example, such a shape as a substantially U-shape whose two end portions are separated from each other like a letter "U", or a shape such as a V-shape whose two end portions are widely opened or a roundish horseshoe shape. Other than these, the "contact-avoiding shape" may also include, for example, such a shape in a top view as to be able to avoid contact with the connector 4 even if the shape does not have two end portions (not separated from each other), or does not have end portions widely opened, such as a substantially rectangular shape (frame-like shape), a substantially C-shape, a substantially circular shape, or a polygonal shape.

If the "contact-avoiding shape" is, for example, a substantially U-shape, a substantially V-shape, a substantially C-shape, or the like, in a top view, it is preferred that mutually opposite portions (specifically, two end portions) have a space therebetween, and it is more preferred that a dimension of the space (specifically, a dimension in a direction in which the two opposite end portions are separated from each other) be larger than a dimension of the connector 4 (specifically, a long-side dimension of the main body of the connector 4).

The shape of the component for grounding 10, particularly the shape in a top view thereof, is not particularly limited as long as it is such a shape as to be able to avoid contact with the connector 4. It is preferred that the component for grounding 10 have, for example, a substantially U-shape in a top view as the contact-avoiding shape, specifically, as a shape that does not contact the connector. Particularly, it is preferred that the third face (13) have a substantially U-shape in a top view, as shown in FIG. 2.

The shape in a top view of the component for grounding 10 is not particularly limited, but may be appropriately determined according to the shape in a top view of a connector to be used.

The component for grounding 10 is characterized in that, when it is mounted on the second motor case 2, at least a part of the third face (13) has a "contact-avoiding shape", specifically, does not physically contact the connector.

Conventionally, a grounding metal fitting is so positioned as to be interposed between the second motor case 2 and the connector 4, and fastened together with screws (see FIG. 3 of PTL 3), and thus the connector 4 may be damaged when the plug 3 and the connector 4 are detached from each other, resulting in breakage of an electrical connection between the connector 4 and the grounding metal fitting. The component for grounding 10, however, does not contact the connector 4 by virtue of the "contact-avoiding shape", and thus such damage as conventional one will not occur, so that an electrical connection can be stably maintained. Consequently, the present disclosure can provide an electrical connection, particularly a ground circuit, having more improved durability.

In addition, according to the component for grounding 10, the connector 4 can be mounted alone by press-fitting into the second motor case 2. For example, by inserting the downward extending portion of the connector 4 shown in FIGS. 6(A) to 6(F) into the opening portion 22 provided in the stage 21 of the second motor case 2 shown in FIGS. 5(A) to 5(F), the connector 4 can be mounted by press-fitting into the second motor case 2 (see FIG. 8).

Figure 8:
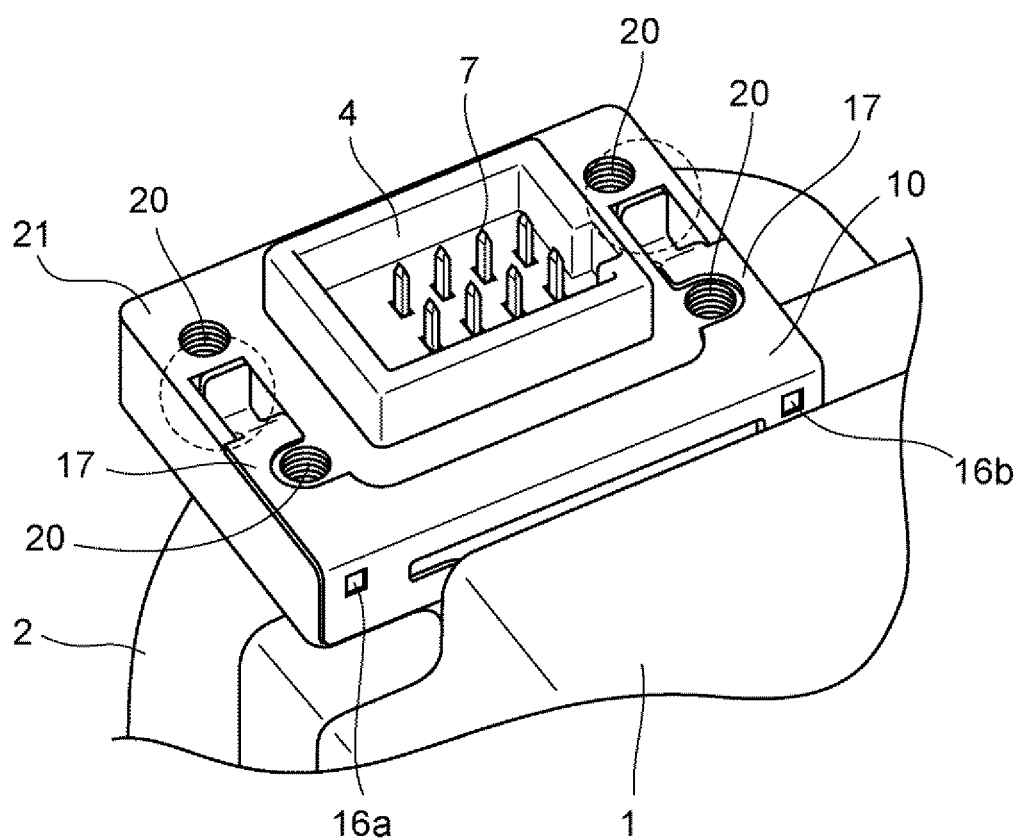
FIG. 8 is a schematic diagram schematically showing a relation between the component for grounding according to an embodiment of the present disclosure, the first motor case, the second motor case, and the connector provided on the second motor case.

Furthermore, according to the component for grounding 10, on the stage 21 of the second motor case 2, a packing such as a rubber packing or a liquid packing, for example, may be positioned between the component for grounding 10 and the connector 4 (see FIGS. 2 and 8). By positioning such a packing, entry of moisture or dust can be prevented, so that the stability of an electrical connection can be more improved. It should be noted that such a packing may be positioned on a bottom face of the connector 4 (see FIG. 7B).

In the component for grounding 10, for example as shown in FIGS. 1A and 2, the first face (11) can be positioned opposite the first motor case 1, the second face (12) can be positioned opposite the second motor case 2, and the third face (13) can be positioned opposite the plug 3. At this time, the first face (11) may be interposed between the first motor case 1 and the second motor case 2, and the third face (13) may be interposed between the second motor case 2 and the plug 3 (see FIGS. 1B and 8).

As described above, it is preferred that the first face (11) and the third face (13) of the component for grounding 10 both have conductivity and be contiguous to each other (see FIG. 2).

It is preferred that the first face (11) and the third face (13) of the component for grounding 10 be contiguous to each other and perpendicularly coupled with each other (see FIG. 2).

The first face (11) of the component for grounding 10 needs to have at least a part thereof in contact with the conductive first motor case 1, specifically, with a part of the conductive case main body 1*a* (see FIGS. 4(A) to 4(F) and FIGS. 9(A) and 9(B)).

The third face (13) of the component for grounding 10 needs to have at least a part thereof in contact with the conductive plug 3, specifically, with the conductive plug cover 3*a* (see FIGS. 7(A) to 7(F)).

Via the component for grounding 10, the plug 3 and the first motor case 1 can be electrically connected together, and a ground circuit (GND) can be formed therebetween. Since the plug 3 near the conducting cable 5 and the conductive first motor case 1 are electrically connected together, a more stable ground circuit can be formed. In addition, since the component for grounding 10 does not physically contact the connector 4, the durability of an electrical connection, particularly of a ground circuit, is more improved.

Using the component for grounding 10 enables an electrical connection, particularly a ground circuit, having more improved durability to be formed.

Therefore, without a shell provided inside the plug 3, a shield against electromagnetic susceptibility (EMS) and/or electromagnetic interference (EMI) can be provided.

A contact for ground does not need to be provided separately inside the plug 3, either. Furthermore, a lead for ground is also unnecessary.

For these reasons, using the component for grounding 10 enables the plug 3 to be miniaturized more.

Hereinafter, the component for grounding according to an embodiment of the present disclosure will be fully described.

The component for grounding according to an embodiment of the present disclosure has conductivity, and, as shown in FIGS. 3(A) to 10(C), for example, has, at least, the first face (11) positioned opposite the first motor case 1 having conductivity, the second faces (12*a*, 12*b*) positioned opposite the second motor case 2 having an insulating property and provided opposite the first motor case 1, and the third face (13) positioned opposite the plug 3 having conductivity (see FIGS. 3(A) to 3(F) and FIG. 8).

The first face (11) and the third face (13), and the second faces (12*a*, 12*b*) are in a front-back relation in the component for grounding 10 (see FIG. 2). For an electrical connection between the first motor case 1 and the plug 3, the first face (11) and the third face (13) are contiguous to each other (see FIGS. 3(A) to 3(F)).

The second motor case 2 is provided with the connector 4 couplable with the plug 3 (see FIGS. 5(A) to 5(F), FIGS. 6(A) to 6(F) and FIGS. 7(A) to 7(F)).

On the second motor case 2, the component for grounding 10 has a substantially U-shape that does not contact the connector 4 so as to be positioned around the connector 4 (see FIGS. 3(A) to 3(F), FIG. 8 and FIGS. 9(A) and 9(B)).

Figure 3D:
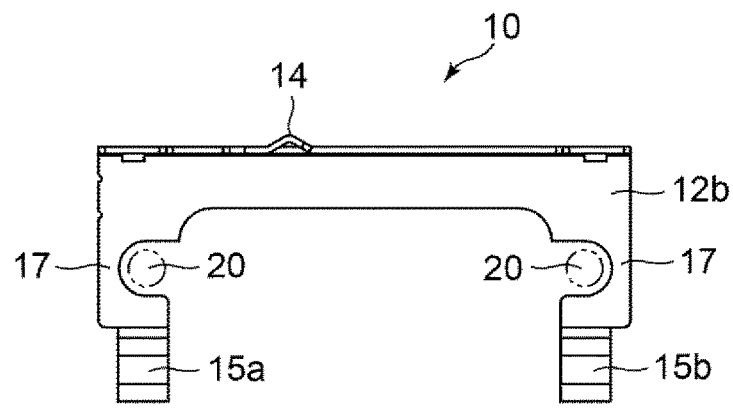
FIGS. 3A to 3F are schematic diagrams schematically showing a component for grounding according to an embodiment of the present disclosure.
Figure 3C:
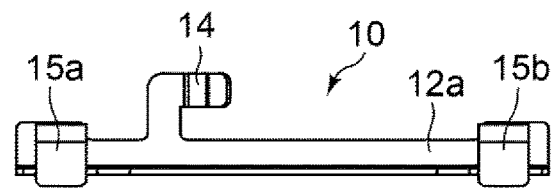
Figures 3A, 3E, 3F:
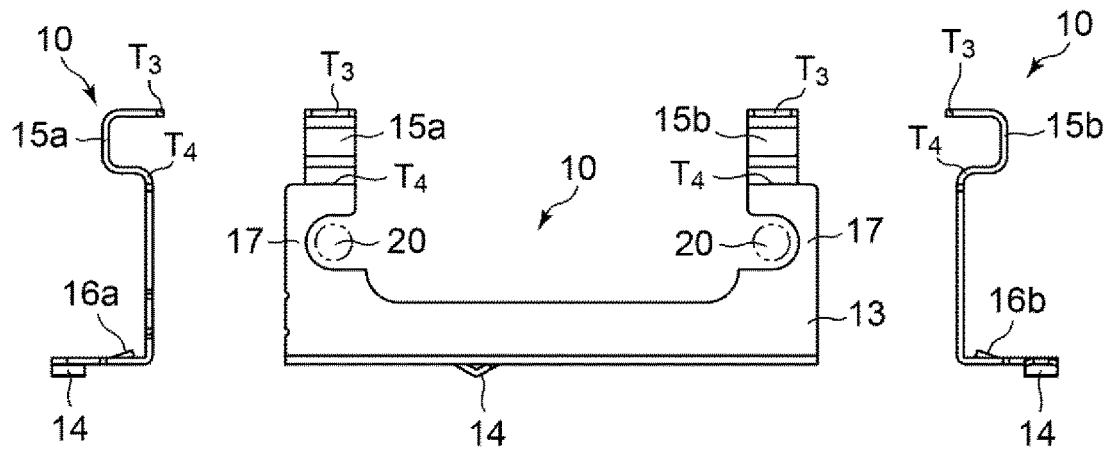
Figure 3B:
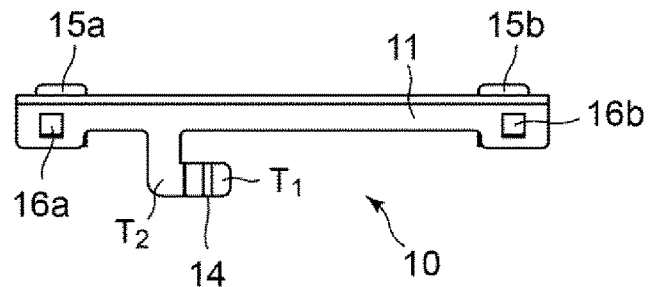

In the component for grounding 10 according to an embodiment of the present disclosure, the first face (11) may further have a spring-like portion 14 abuttable with the first motor case 1 (see FIGS. 3A and 3B).

The "spring-like portion" in the present disclosure means a portion having elasticity and displaceable like a spring under an external force, namely, an elastic portion.

The spring-like portion 14 may extend from the first face (11). The spring-like portion 14 does not have any particular limitation on its shape as long as it has elasticity. For example, the shape of the spring-like portion 14 may be a shape having at least one ridge portion and/or trough portion having a substantially V-shape or substantially U-shape in cross section (see FIGS. 3A and 3D). The spring-like portion 14 does not any particular limitation on the number of ridge portions and/or trough portions. The ridge portion does not have any particular limitation on its height as long as it rises from the first face (11) and a top portion thereof can abut with the first motor case 1 (see FIG. 3A, FIG. 3D and FIGS. 9(A) and 9(B)).

The spring-like portion 14 can more suitably maintain abutment with the first motor case 1 by virtue of its elasticity even in a severe temperature environment. Therefore, the spring-like portion 14 can more suitably maintain an electrical connection with the first motor case 1, and consequently can improve the durability of a ground circuit more.

It is preferred that the spring-like portion 14, as shown in FIG. 3B, for example, have both a fixed end (T2) connected to the first face (11) and a free end (T1). It is preferred that at least one ridge portion be located between the fixed end (T2) and the free end (T1).

The top portion of the ridge portion of the spring-like portion 14 may be located in a position higher than the level of a plane including the first face (11). Such a spring-like portion 14, particularly the ridge portion, may be formed by bending and/or molding, or the like.

Since having both the fixed end (T2) and the free end (T1), the spring-like portion 14 can more suitably adjust the displacement of the spring-like portion 14. Therefore, the electrical connection with the first motor case 1 can be more suitably maintained. Consequently, the durability of the ground circuit can be improved more.

Figure 9A:
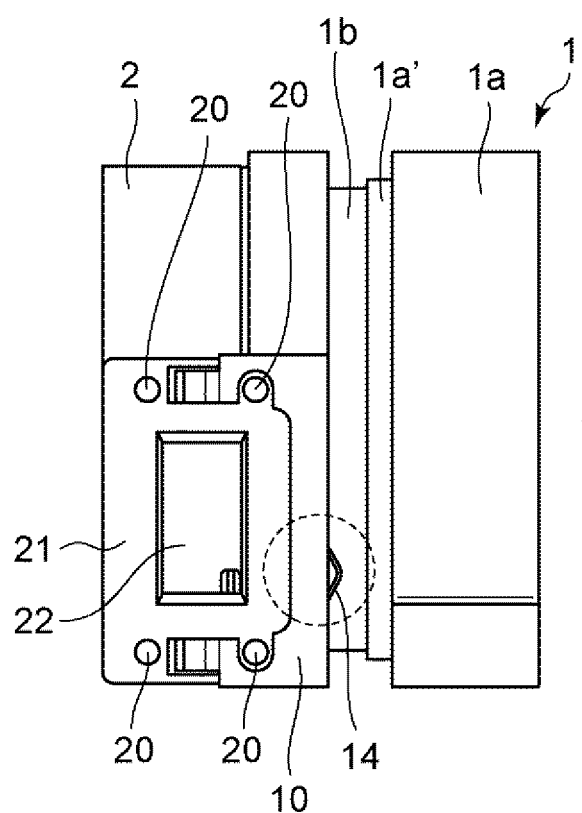
FIGS. 9A and 9B are schematic diagrams schematically showing a relation between the component for grounding according to an embodiment of the present disclosure and the first motor case.
Figure 9B:
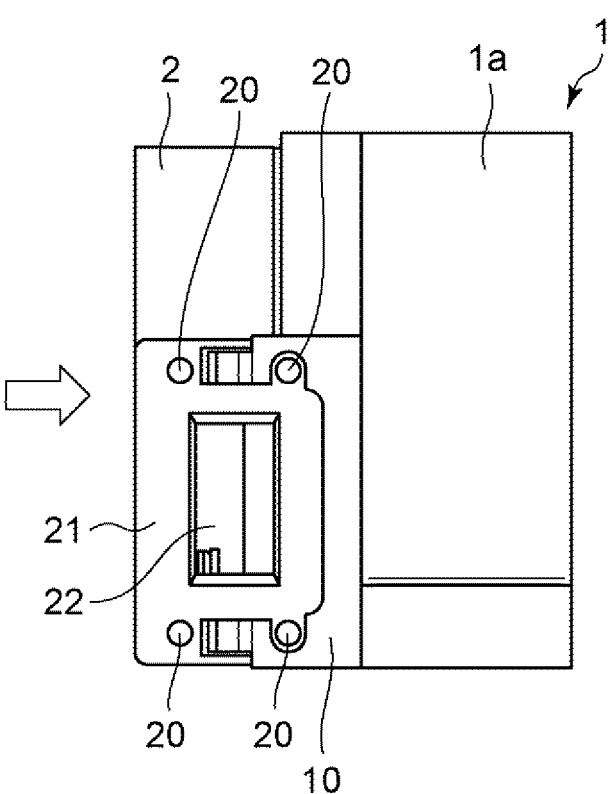

For example, after the component for grounding 10 is placed on the stage 21 of the second motor case 2, as shown in FIG. 9A, the spring-like portion 14 can be abutted against the main body 1a of the first motor case 1 by coupling the first motor case 1 and the second motor case 2 with each other, as shown in FIG. 9B. At this time, the ridge portion of the spring-like portion 14 may abut with the case main body 1a, and simultaneously at least a part of the first face of the component for grounding 10 may abut with the case main body 1a (see FIG. 9B). In addition, a recessed portion or a groove may be provided at a location where the case main body 1a abuts against the spring-like portion 14 so that the ridge portion of the spring-like portion 14 and the case main body 1a are brought into more suitable contact with each other.

The first case (11) of the component for grounding 10, as shown in FIG. 3B, for example, may have at least one engaging portion 16, specifically, a first engaging portion 16a and a second engaging portion 16b. Both the first engaging portion 16a and the second engaging portion 16b are a portion that may be so formed as to project into the second face (12a) on the back side of the first face (11) (see FIGS. 3E and 3F).

In the second motor case 2 opposite the second face (12a), a recessed portion having a shape complementary to the first engaging portion 16a and the second engaging portion 16b may be formed in a position where the first engaging portion 16a and the second engaging portion 16b may be positioned (not shown). Since the first engaging portion 16a and the second engaging portion 16b mate with the at least two recessed portions, respectively, provided in the second motor case 2, unnecessary displacement of the component for grounding 10 on the second motor case 2 can be suppressed.

In the component for grounding 10 according to an embodiment of the present disclosure, the third face (13) may further have at least one spring-like portion 15 abuttable with the plug 3, specifically, a first spring-like portion 15a and a second spring-like portion 15b (see FIGS. 3(A) to 3(F)).

The first spring-like portion 15a and the second spring-like portion 15b may each extend from the third face (13). The spring-like portions (15a, 15b) do not have any particular limitation on their shapes as long as they have elasticity. For example, their shapes may be a shape having at least one ridge portion and/or trough portion having a substantially U-shape or a substantially V-shape in cross section. The number of ridge portions and/or trough portions in the spring-like portions (15a, 15b) is not particularly limited.

It is preferred that the first spring-like portion 15a and the second spring-like portion 15b each have both a free end (T3) and a fixed end (T4). It is more preferred that at least one trough portion be located between the free end (T3) and the fixed end (T4). It is preferred that the free end (T3) of the spring-like portions (15a, 15b) project toward the plug 3 beyond a plane including the third face (13) and abut with the plug 3, specifically, the plug cover 3a (see FIGS. 10(A) to 10(C)).

A distal end portion or an edge of the free end (T3) of the spring-like portions (15a, 15b) is located in a position higher than the level of the plane including the third face (13) (see FIG. 10B). Such a free end (T3) of the spring like-portions (15a, 15b) may be formed by bending and/or molding, or the like.

More specifically, the free end (T3) of the spring-like portions (15a, 15b) may project from the plane including the third face (13) by a height about 0.5 or more times and 5 or less times the thickness of the component for grounding 10.

Since the spring-like portions (15a, 15b) have both the free end (T3) and the fixed end (T4), the displacement of the spring-like portion can be suitably adjusted. When the respective free ends (T3) of the spring-like portions (15a, 15b) abut with the plug 3, specifically, the plug cover 3a, more specifically, a bottom of the plug cover 3a, the abutment with the plug 3 can be suitably maintained even in a more severe temperature environment. Therefore, an electrical connection with the plug 3 can be more suitably maintained. Consequently, the durability of the ground circuit can be improved more.

The free end (T3) of the spring-like portions (15a, 15b) can be abutted with the plug 3 by placing the component for grounding 10 on the stage 21 of the second motor case 2, as shown in FIG. 10B, for example, and thereafter fixing the plug 3 to the stage 21 of the second motor case 2, as shown in FIG. 10C, for example. Here, FIGS. 10B and 10C show pre-fixation and post-fixation cross sections, respectively, of the plug 3 and the second motor case 2 taken along X-X' in FIG. 10A. At this time, the edge of the free end (T3) of the spring-like portions (15a, 15b) may abut with the bottom of the plug cover 3a, and simultaneously the third face of the component for grounding may abut with the bottom of the plug cover 3a. In addition, a recessed portion may be provided at a location where a bottom portion of the plug cover 3a abuts against the edge of the free end (T3) of the spring-like portions (15a, 15b), thereby bringing the edge of the free end (T3) of the spring-like portions (15a, 15b) and the bottom of the plug cover 3a into more suitable contact with each other.

For example, as shown in FIGS. 3(A) to 3(F) and FIGS. 10(A) to 10(C), the spring-like portions (15a, 15b) may have a ridge portion so formed as to project into the back side of the third face (13), namely, into the second face (12b) side. It should be noted that such a ridge portion is a trough portion as viewed from the third face (13) side. The cross-sectional shape of such a ridge portion is not particularly limited, but may be a substantially U-shape, as shown (see FIGS. 3E and 3F). In the stage 21 of the second motor case 2 opposite such a second face (12b), a recessed portion 23 for accommodating the ridge portion of the spring-like portions (15a, 15b) maybe formed in a position that may correspond to the ridge portion (see FIG. 5B). Since the ridge portion of the spring-like portions (15a, 15b) mates with the recessed portion 23 provided in the stage 21 of the second motor case 2, the fixed end (T4) of the spring-like portions (15a, 15b) engages along an edge portion of the stage 21, so that the free end (T3) of the spring-like portions (15a, 15b) can be more suitably displaced. It is preferred that such a recessed portion 23 have such dimensions, shape, and space therein as not to contact the top portion of the ridge portion of the spring-like portion.

In the form shown, the plug 3 and the second motor case 2 can be fixed to each other with a fixing means such as a screw 6 via the component for grounding 10. A shank or threaded portion of the screw 6 can be positioned in a threaded hole 20 provided in the second motor case 2 and coupled with the second motor case 2 (see FIGS. 5(A) to 5(F), FIG. 8 and FIGS. 10(A) to 10(C)). Fixation of the plug 3 to the second motor case 2 is not limited to fixation with a fixing means such as the screw 6 but may be direct or indirect fixation by means of a suitable locking mechanism, mating and/or engaging, or the like.

It is preferred that the third face (13) of the component for grounding 10 have 80% or more of its area covered with the plug 3 in a top view. Since most of the third face (13) is covered with the plug 3, the contact with the plug 3 can be more suitably maintained. Such a configuration can more suitably maintain an electrical connection. Consequently, the durability of the ground circuit can be improved more.

The component for grounding 10 may have at least one narrow portion 17 in the third face (13) (see FIG. 3A). By providing the narrow portion 17 in the third face (13) of the component for grounding 10, a coupling portion between the plug 3 and the second motor case 2, for example, a screw, a locking mechanism, or the like, can be suitably avoided.

The narrow portion 17 may be formed by notching a part of the third face (13) of the component for grounding 10, as shown in FIG. 3A, for example. Alternatively, the narrow portion 17 may be formed by providing an opening portion having a shape such as a rectangle or a circle in the third face (13). It is preferred that the narrow portion 17 be formed at a distance from the fixed end (T4) of the spring-like portions (15*a*, 15*b*). It is preferred that the narrow portion 17 be interposed between the plug 3 and the second motor case 2 and covered with the plug 3. This enables the fixed end (T4) of the spring-like portions (15*a*, 15*b*) to be more suitably fixed. This in turn enables the displacement of the free end (T3) of the spring-like portions (15*a*, 15*b*) provided in the third face (13) to be more suitably controlled.

The first face (11) and the third face (13) of the component for grounding 10 may be so formed as to be contiguous to each other and bent along the edge portion of the stage 21 of the second motor case 2 (see FIG. 8 and FIGS. 9(A) and 9(B)). The shape and dimensions of the stage 21 provided on the second motor case 2 are not particularly limited. It is preferred that the stage 21 have the same shape and dimensions in a top view as the plug 3, or a little larger shape and dimensions than it.

The height of a portion of the stage 21 where the component for grounding 10 is not positioned may be made one-step higher by the amount of thickness of the component for grounding 10 so that a height after the component for grounding 10 is positioned and the height of the portion where the component for grounding is not positioned will be the same when the component for grounding 10 is positioned on the stage 21 of the second motor case 2. In other words, the height of a portion of the stage 21 where the component for grounding 10 is positioned may be made one-step lower by the amount of thickness of the component for grounding 10.

It is preferred that the component for grounding 10 be a single component. Since the component for grounding 10 is a single component, an electrical connection, particularly a ground (GND) circuit, having more improved durability, can be formed.

Figure 11A:
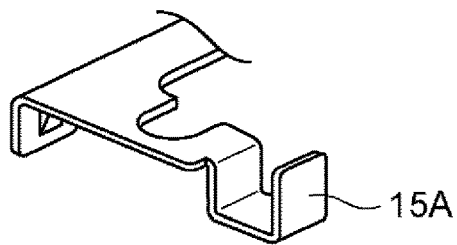
FIGS. 11A to 11D are schematic diagrams schematically showing a variation of the component for grounding of the present disclosure.

The component for grounding 10 of an embodiment according to the present disclosure has the two spring-like portions (15*a*, 15*b*) in the third face (13) that can be electrically connected with the plug 3 (see FIGS. 3(A) to 3(F)). These two spring-like portions (15*a*, 15*b*) have a substantially U-shape in cross section. The spring-like portion having such a shape is referred to as spring-like portion of a "type 15A" (see FIG. 11A). The spring-like portion of the type 15A is preferred because the amount of displacement of its free end is large, and adjustment thereof is easy.

Figure 11B:
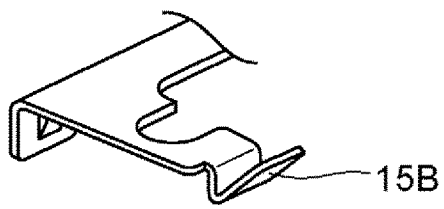
Figure 11C:
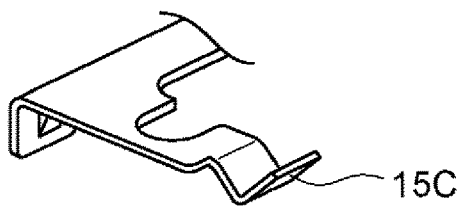
Figure 11D:
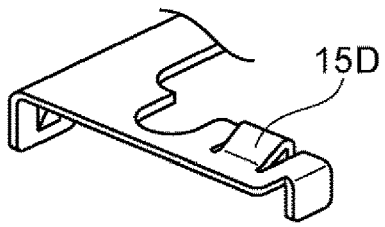

As a variation of the component for grounding 10 of an embodiment according to the present disclosure, a component for grounding having a spring-like portion of a "type 15B", "type 15C" and "type 15D" shown in FIGS. 11B to 11D, for example, may be mentioned.

The spring-like portion of the "type 15B" is characterized by having a substantially V-shape in cross section (see FIG. 11B). The free end of the spring-like portion projects from the plane including the third face. In addition, the fixed end is positioned along the shape of an edge portion of the second motor case 2.

The spring-like portion of the "type 15C" is characterized by having a substantially V-shape in cross section (see FIG. 11C). The free end of the spring-like portion projects from the plane including the third face.

The spring-like portion of the "type 15D" is different in position from the types 15A to 15C. The spring-like portion of the "type 15D" is characterized in that the cross section thereof has a substantially V-shape, but the ridge portion thereof projects upward from the third face toward the plug 3, and a top portion of the ridge portion abuts with the plug 3 (see FIG. 11D).

In addition, the spring-like portion of the "type 15D" may have a portion having a shape similar to the fixed end of the types 15A and 15B in a position corresponding to the spring-like portion of the types 15A and 15B, and such a portion can extend along the shape of the edge portion of the second motor case 2 and can more suitably engage with the second motor case 2.

The component for grounding 10 is not limited to the above embodiment. The component for grounding 10 may be appropriately modified within the scope of the present disclosure.

The component for grounding 10 is applicable to grounding of various motors, particularly an industrial motor. The component for grounding 10 can be used in a severe temperature environment (particularly, at 105° C. for ten days, or the like). The component for grounding 10 can form an electrical connection, particularly a ground circuit, having more improved durability, even in such an environment. For such a reason, the component for grounding 10 can be particularly suitably used in an industrial servomotor including an encoder or the like. More specifically, the component for grounding 10 can be more suitably used in a servomotor of a cutting machine, particularly of a CMC cutting machine, or the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A component for grounding having conductivity comprising:
   a first face positioned opposite a first motor case having conductivity;
   a second face positioned opposite a second motor case having an insulating property and positioned opposite the first motor case; and
   a third face positioned opposite a plug having conductivity, wherein
   the first and third faces and the second face are in a front-back relation in the component for grounding, and the first face and the third face are contiguous to each other for an electrical connection between the first motor case and the plug, and
   the second motor case is provided with a connector couplable with the plug, and, on the second motor case, at least a part of the third face has a contact-avoiding shape.

2. The component for grounding according to claim 1, wherein the contact-avoiding shape is a substantially U-shape in a top view.

3. The component for grounding according to claim 1, wherein the first face of the component for grounding has a spring-like portion abutting with the first motor case, and the spring-like portion has both a fixed end and a free end.

4. The component for grounding according to claim 1, wherein the third face of the component for grounding has a spring-like portion abutting with the plug, and the spring-like portion has both a fixed end and a free end.

5. The component for grounding according to claim 4, wherein the free end abuts with the plug.

6. The component for grounding according to claim 1, being a single component.

* * * * *